(12) United States Patent
Broers (10) Patent No.: US 11,192,611 B2
(45) Date of Patent: Dec. 7, 2021

(54) FLUID FOIL

(71) Applicant: Christopher Broers, London (GB)

(72) Inventor: Christopher Broers, London (GB)

(*) Notice: Subject to any disclaimer, the term of this patent is extended or adjusted under 35 U.S.C. 154(b) by 0 days.

(21) Appl. No.: 16/480,876

(22) PCT Filed: Jan. 16, 2018

(86) PCT No.: PCT/GB2018/050103
§ 371 (c)(1),
(2) Date: Jul. 25, 2019

(87) PCT Pub. No.: WO2018/138477
PCT Pub. Date: Aug. 2, 2018

(65) Prior Publication Data
US 2019/0360510 A1 Nov. 28, 2019

(30) Foreign Application Priority Data
Jan. 25, 2017 (GB) ...................................... 1701264

(51) Int. Cl.
*B63B 1/24* (2020.01)
*B64C 3/20* (2006.01)
*F15D 1/12* (2006.01)

(52) U.S. Cl.
CPC ............... *B63B 1/248* (2013.01); *B64C 3/20* (2013.01); *F15D 1/12* (2013.01)

(58) Field of Classification Search
CPC ........... B63B 1/248; B63B 3/38; B63B 32/60; B64C 3/20; B64C 2003/445; B64C 3/52; B64C 11/20; B64C 11/205; F15D 1/12

USPC ........... 244/219, 123.5, 123.6, 123; 416/226, 416/232, 233, 240, 241 R, 241 A
See application file for complete search history.

(56) References Cited

U.S. PATENT DOCUMENTS

| | | | |
|---|---|---|---|
| 5,181,678 A | 1/1993 | Widnall et al. | |
| 5,480,331 A * | 1/1996 | Lewis | B63B 32/60 441/79 |
| 6,622,974 B1 * | 9/2003 | Dockter | B64C 3/48 244/218 |
| 9,745,031 B2 * | 8/2017 | Buechler | B63H 1/36 |
| 2006/0163431 A1 * | 7/2006 | Dittrich | B64C 3/26 244/126 |

FOREIGN PATENT DOCUMENTS

EP 2993118 A1 3/2016

OTHER PUBLICATIONS

European Office Action for Application No. 18 701 212.5-1010 dated Aug. 6, 2020.
International Search Report and Written Opinion for PCT/GB2018/050103 dated Mar. 23, 2018.

* cited by examiner

*Primary Examiner* — Ajay Vasudeva
(74) *Attorney, Agent, or Firm* — Tarolli, Sundheim, Covell & Tummino LLP (57) ABSTRACT

A passively controlled fluid foil has a span; and a rigid spar extending in the spanwise direction, a cellular material and a flexible outer surface defining a profile of the outer surface of the foil and encapsulating the cellular material and the spar.

19 Claims, 9 Drawing Sheets

FLUID FOIL

RELATED APPLICATIONS

The present invention is a U.S. National Stage under 35 USC 371 patent application, claiming priority to Serial No. PCT/GB2018/050103, filed on 16 Jan. 2018; which claims priority of GB 1701264.2, filed on 25 Jan. 2017, the entirety of both of which are incorporated herein by reference.

FIELD OF THE INVENTION

The present invention relates to a passively controlled fluid foil.

BACKGROUND OF THE INVENTION

Conventional foils typically have rigid or fixed structures which generate lift and drag forces as a result of the shape of the foil and the angle of attack when in the fluid stream. The foil may be an aerofoil for example if placed in air or a hydrofoil if placed in water.

Morphing, adaptive or shape-adaptable foils change their geometric shape or profile during use, for example an aeroplane with a morphing wing changes the wing shape during flight to optimise performance. An active morphing foil uses a form of externally applied mechanical force to move the foil from one position or shape into another, such as an actuator located within the foil or smart materials, which deform or change shape when a voltage is applied. In contrast, a passively controlled foil changes shape through passive interaction with the fluid flow, without any additional external assistance. Changing the shape of the foil may occur using a combination of active and/or passive structures.

SUMMARY OF THE INVENTION

At its most general, the invention provides a passively controlled fluid foil having a three layer construction. The three layer construction provides different materials in each layer, with each material exhibiting differing flexural properties in the fluid flow.

A first aspect of the invention provides a passively controlled fluid foil having a span comprising a rigid spar extending in the spanwise direction, a cellular material and a flexible outer surface defining a profile of the outer surface of the foil and encapsulating the cellular material and the spar.

The foil is constructed from a rigid spar, a cellular material and a flexible elastic outer material. The cellular material provides a layer able to deflect in a controlled manner above a load threshold, whilst the flexible outer surface elastically deforms in order to provide adaptation of the foil profile under localised fluid pressure and inertial loads. The pressure forces are typically low so the deformation at the trailing edge is largely due to fluid inertia at the trailing edge. By adjusting the profile and material of the rigid spar, the cellular material and the flexible outer surface, the foil can be designed to flex and twist according to performance requirements.

Relative to conventionally constructed rigid and partially flexible foils, a foil according to the invention results in improved foil performance in use, as the shape of the foil is able to respond by passively deforming under load. The ability of the foil to retain laminar or streamlined flow over the surface of the foil is thereby increased, resulting in the required lift performance being achieved at lower operational angles of attack. The flow profile at the trailing edge is improved (due to cellular material and flexible outer surface deformation or flow tethering under load), and there is an improved response to variation in onset flow angle (dynamic lift profile), and the foil exhibits a higher stall angle (due to spanwise tip and trailing edge deformation). Drag, cavitation, aeration, vibration, and peak loading are all reduced. The foil profile is able to adapt under load, and therefore does not suffer from performance limitations relating to the usual design compromise of specifying a soft foil for lower performance and maneuverability, or specifying a stiff foil for high performance.

The rigid spar, cellular material and flexible elastic outer material make up three material layers from which the spar is constructed. Each layer has different natural frequencies, and therefore only one material layer at any one time is likely to exhibit resonance. This reduces the extent of the vibration likely to occur within the foil at any particular frequency range. Reduced vibration resulting from reduced resonance effects provides improved boundary layer control and therefore an improved foil performance.

The foil may be constructed of readily available materials and may be inexpensive to manufacture.

The spar is a rigid spar, i.e. it does not substantially flex, bend or move under normal operational loading of the foil. The rigid spar is of relatively high stiffness in comparison to the other material layers from which the foil is constructed. The cellular material layer is a cellular material comprising cells, for example a honeycomb material. The cellular material layer provides limited and substantially elastic deflection above a particular load threshold. The flexible outer surface layer defines the profile of the foil, and the profile describes the outline of the foil in a chordwise direction. The flexible outer surface layer is capable of bending or flexing easily without breaking, and may be generally elastically flexible. The flexible outer surface layer encapsulates the cellular material layer and the spar, i.e. the flexible outer surface layer encloses the other layers.

By altering the profile and thickness of each layer it is possible to design the foil to respond to different loading conditions in an optimal way, thus tuning the foil.

The geometry and position of the spar within the foil determines the centre of rigidity of the foil. The centre of rigidity is the location about which lateral forces act and twisting moments occur. The centre of rigidity may also be referred to as the centre of moment.

Various optional but preferred features of the present invention are presented in the dependent claims. Such features may be combined with any aspect of the invention, either singly or in any combination.

The cellular material may encapsulate the spar. The foil may thereby flex differently according to the loading experienced by the foil in the fluidstream. The cellular layer provides controlled flexure when the foil experiences loads above a designed limit, whilst the flexible outer surface allows the profile of the foil to respond to local flow conditions and maintain laminar or streamlined flow across the foil. The foil performance is thereby optimised to local loading conditions and provides a more predictable foil performance.

Alternatively, the spar may encapsulate the cellular material. Applications where the foil may be subjected to high loads can require minimal foil deflection and a maximum foil strength. Providing a foil construction where the spar encapsulates the cellular material maximises the foil strength and rigidity. The flexible outer surface of the foil still allows the foil to passively deform, reducing the likelihood of separation, minimising the size of the boundary layer and providing many of the benefits already stated above over conventionally constructed rigid and partially flexible foils.

The spar may comprise a tube. The spar may comprise a tapering tube. A tapering tube enables the centre of rigidity to be varied along the span. The rigidity of the foil is thereby adjusted from the leading to edge to the trailing edge. A tapering tube allows the foil profile to narrow in the spanwise direction towards the tip of the foil. It may also allow the chordwise position of the spar to vary along the foil in the spanwise direction. Tubular construction also enables weight to be minimised without significant loss of strength or rigidity.

The spar may be a single spar. This enables the profile of the spar within the foil to be altered according to design requirements, taking up as little or as much of the foil profile as may be required.

The foil has a chord, the chord may have a length in the chordwise direction, and the spar has a leading edge. The leading edge of the spar may be located in the chordwise direction at substantially 2-10% of the chord length from a leading edge of the foil.

The spar may comprise a fibre reinforced matrix material or a metal.

The profile of the foil as manufactured may be substantially symmetrical about a chordwise extending axis.

The cellular material has an outer surface having a profile, the profile of the outer surface of the cellular material may be substantially the same as (i.e. substantially correspond to) the profile of the foil as manufactured. The cellular material comprises cells, the cells may have an axis arranged substantially perpendicular to the outer surface of the foil. The cellular material may have a honeycomb structure.

The flexible outer surface may at least partially fill one or more cells of the cellular material. The cellular material may comprise a foamed polymer or wood. The flexible outer surface may comprise rubber or an elastomer. The flexible outer surface may comprise silicon rubber. A flexible outer surface provides the benefit of reduced marine growth on the foil over time.

The spar has a chordwise location within the foil, and the chordwise location of the spar may change along the span of the foil. At a spanwise location the spar may be offset in a chordwise direction from a resultant lift force acting on the foil, the offset resulting in a twisting moment acting on the foil. The spar may be offset in the chordwise direction from the resultant lift force at a first spanwise location. The spar may be offset from the resultant lift force in a direction generally opposite to the first chordwise direction at a second spanwise location. For example, the first spanwise location may be at a root of the foil and the second spanwise location may be at a tip of the foil. Thus, the twisting moment may act on the foil, the twisting moment may act in a first rotational direction at the first spanwise location and at an opposite second rotational direction at the second spanwise location.

The geometry of the spar and of its chordwise position within the foil may be configured such that the foil twists in a positive direction starting near the root of the foil and a negative direction at the tip when loaded. The direction of twist depends on the offset between the spar and the centre of lift, as described above. Positive twist describes the foil twisting in a clockwise direction about the spar, whilst negative twist describes the foil twisting in an anti-clockwise direction about the spar. Positive twist at the spanwise root of the foil provides improved lift or side force for a given angle to the flow, whilst negative twist at the tip or lower spanwise end of the foil results in reduced drag at the spanwise tip of the foil.

The flexible outer surface may be encapsulated by an outer film. The outer film provides protection for the foil, particularly the flexible outer surface. The flexible outer surface may be susceptible to damage when the foil is in use, for example against any unexpected impact, or to general wear and tear as the board is transported when not in use.

The foil has a leading edge and a trailing edge, the flexible outer surface having a thickness, the thickness may be greater at the leading edge and/or the trailing edge than in a central region intermediate the leading edge and trailing edge.

The flexible outer surface or outer film has a surface finish, and the surface finish may vary across the foil. The surface finish near the leading edge may be smoother than the surface near the trailing edge. Varying the surface finish enables greater control of flow separation at the boundary layer, and therefore the transition from laminar to turbulent flow as fluid flows across the profile of the foil.

The foil may be a hydrofoil, i.e. the foil is used in water and the fluid stream is water. A waterborne craft may incorporate the foil according to the first aspect. windsurf board may have a foil according to the first aspect. The foil may also be fitted to other craft, which typically include one or more foils. For example the foil may be a rudder fitted to a kiteboard or a boat or other craft or vehicle. The foil may be fitted to a hydrofoil craft.

BRIEF DESCRIPTION OF THE DRAWINGS

Embodiments of the invention will now be described with reference to the accompanying drawings, in which:

FIG. 3b shows the foil of FIG. 3a in a fluid stream, FIG. 4a(i) is a chordwise cross-sectional view of a foil according to the first embodiment, having a spar extending from a leading edge region of the foil towards a trailing edge region of the foil, FIG. 4a(ii) shows the foil of FIG. 4a(i) having a hollow spar.

DETAILED DESCRIPTION OF EMBODIMENT(S)

Figure 1:
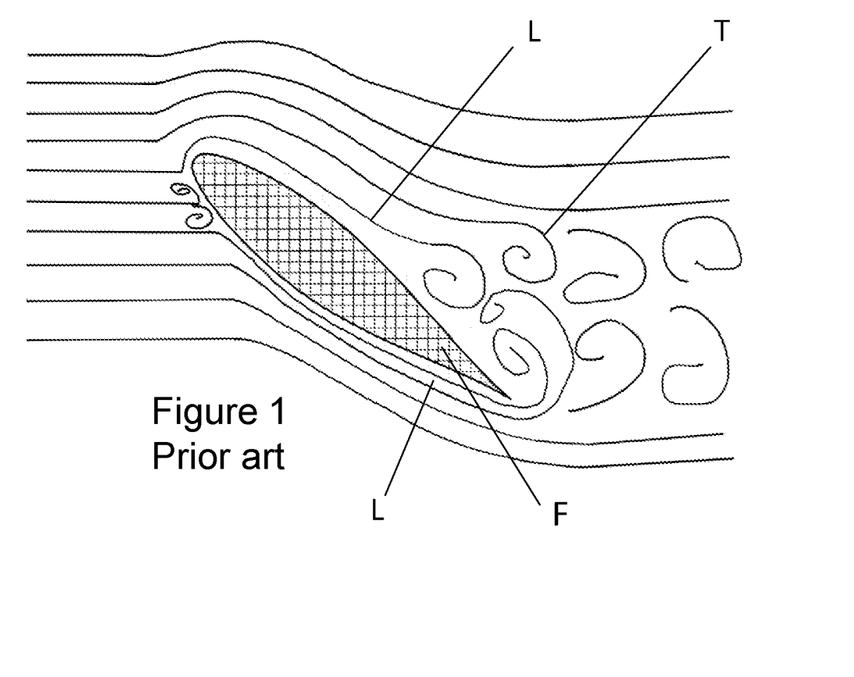
FIG. 1 shows a conventional rigid foil placed in a fluid stream, highlighting regions of laminar flow, turbulent flow and flow separation.

A foil moving through a fluid produces a force. Lift is the component of force perpendicular to the direction of motion. Drag is the component parallel to the direction of motion. An optimised design of fluid foil generally controls lift whilst minimising drag or flow resistance at the desired performance flow velocities. Regions of streamlined flow remain attached to the foil, whereas regions where the flow separates from the foil result in turbulence and a reduction in lift performance and control. FIG. 1 shows a conventional rigid foil F with a symmetrical profile in a chordwise direction. The foil F is placed at an angle of attack in a fluid stream having a flow velocity. Laminar flow L along one side of the foil produces lift, whereas turbulent flow T along the opposing side of the foil F, where the flow separates from the foil, results in flow instabilities and a degradation of predictable behaviour and foil performance at that particular flow velocity.

A foil able to adapt its profile whilst in the flow to maintain attached flow along the profile or surface of the foil results in an optimised and more predictable foil performance with minimised drag.

Figure 2:
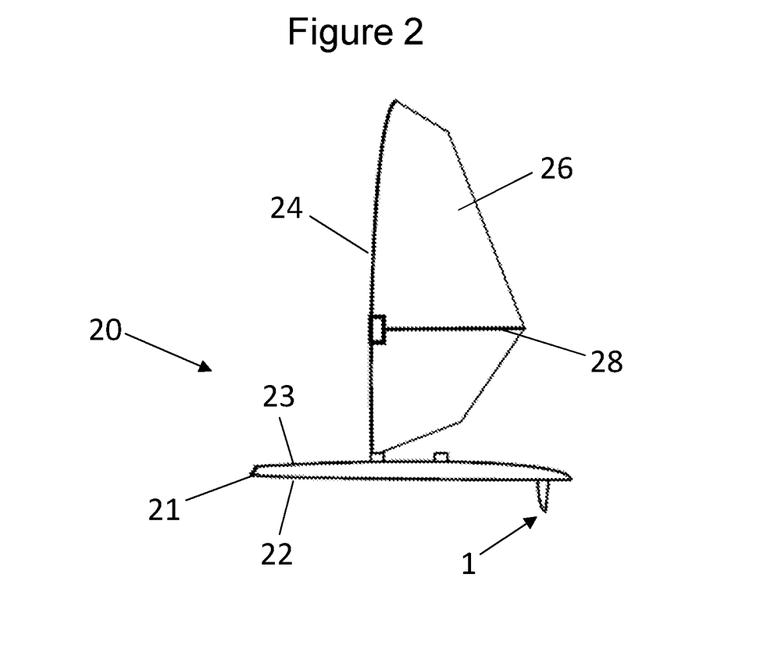
FIG. 2 is a schematic view of a windsurf board having a foil according to the invention.

FIG. 2 shows a perspective view of a windsurf board 20. The windsurf board 20 comprises a board 21, which floats on the surface of the water when in use. The windsurf board 21 has a lower surface 22 which is in contact with water when in use. The lower surface 22 is fitted with a foil 1 according to an embodiment of the invention, which may alternatively be referred to as a fin. The foil 1 extends downwards from the lower surface 22 of the board 20 in to the water, and acts to control the motion of the board 20 through the water. The windsurf board 20 has an upper surface 23. The person windsurfing stands on the upper surface 23. The upper surface 23 is fitted with a mast 24, to which a sail 26 is attached. A boom 28 is attached part way along the length or span of the mast 24 and to the sail 26. The boom 28 provides control of the sail 26 for a person (not shown) operating the windsurf board 20.

The foil 1 could equally be fitted to a kiteboard or any other board, water-going vessel or airborne vehicle having a foil attached. The foil 1 is designed to stabilise and enhance the performance of the board 20 as the board travels through the fluid medium. In the case of a windsurf- or kite-board, the foil 1 is a hydrofoil, since the foil is designed to operate in water. In alternative embodiments, the foil could be an aerofoil, with air as the fluid medium.

Figure 3A:
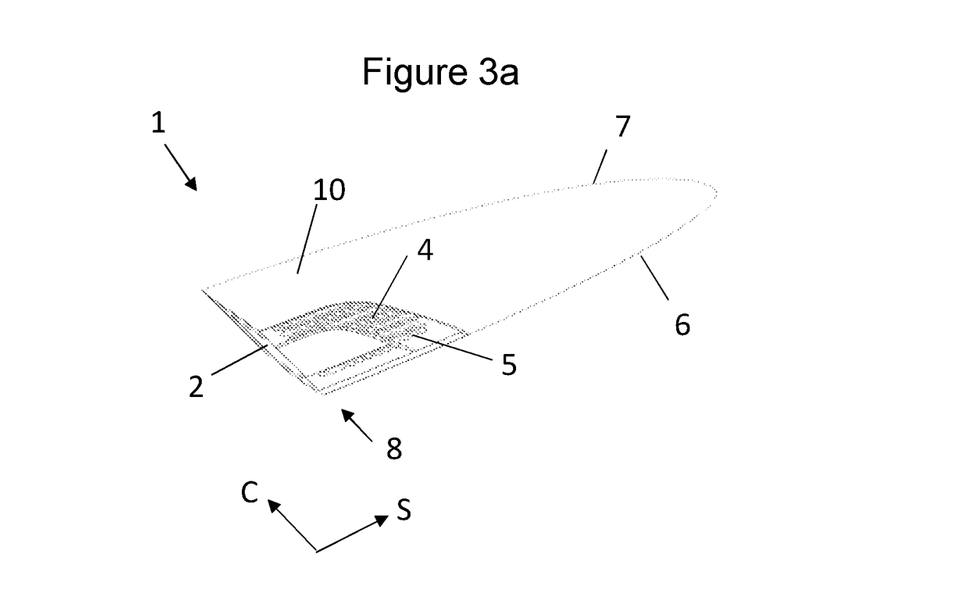
FIG. 3a is a perspective view of a foil according to a first embodiment of the invention in which a rigid spar is encapsulated by cellular material with a flexible outer surface defining the foil profile.

FIG. 3a shows a perspective view of a foil 1a according to a first embodiment of the invention. The foil 1a has a length in a spanwise direction S. The cross-sectional profile of the foil 1a is substantially symmetrical about a central axis in a chordwise direction C. In alternative embodiments, the profile of the foil 1a may be unsymmetrical such that the fluid-contacting surfaces differ from one another. The profile of the foil 1a varies in the spanwise direction S such that its chord length decreases with distance from the root (where it is attached to the board 21) to the tip.

A rigid spar 2 is located at the centre or core of the foil 1. The spar 2 in this embodiment is a solid structure. Alternatively, the spar may be hollow. The spar 2 is made of metal. Alternatively, the spar 2 may be made of a fibre reinforced matrix material, or any other suitable rigid material.

The spar 2 is encapsulated by a cellular material layer 4. The cellular material is moulded to the spar. The cellular material layer 4 has a honeycomb structure, and is for example made from a polymer such as polypropylene or carbon weave. Carbon weave allows more control over how the cellular structure flexes. The honeycomb structure comprises cells 5. Each cell 5 has an axis arranged generally perpendicular to the outer surface of the foil 1a. In alternative embodiments, the polymer material may be, for example, a foamed polymer or wood. FIG. 3a shows the honeycomb structure extending over a majority of the cellular material layer 4. The cellular material provides controlled flexure under load.

An outer surface layer 10 surrounds the cellular material layer 4 and forms the surface of the foil 1. The outer surface layer 10 is formed of a flexible material. The flexible material deforms generally elastically under load. The flexible outer surface 10 deforms or flexes under load in response to the fluid flow, but then returns substantially to its previous undeformed shape once the loading is removed. The flexible material comprises rubber or an elastomer. In alternative embodiments, the flexible material may comprise silicon rubber. The flexible outer surface 10 is designed to be more flexible than the layer of cellular material 4. The flexible outer surface 10 allows local compression and extension of the surface of the foil at the leading and trailing edges.

The combination of the three layers comprising the spar 2, the cellular material layer 4, and the flexible outer surface 10 together make up the foil 1. Each layer has a different profile, although each is symmetrical about the chordwise axis. Although in the illustrated embodiments the cross-sectional profile of each layer is symmetrical about the chordwise axis, in other embodiments the foil may be asymmetric about the chordwise axis and one or more of the layers may be asymmetric about the chordwise axis also. In alternative embodiments, the profile of each layer may vary and may not be symmetrical about the chordwise axis.

Figure 6:
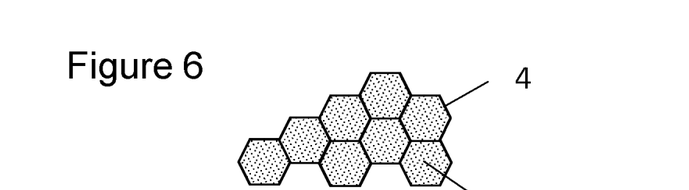
FIG. 6 is a cross-sectional plan view through the cellular layer of a foil according to the first embodiment, showing how the flexible outer surface layer at least partially fills one or more cells of the cellular material.

FIG. 6 is a schematic cross-sectional plan view of the cellular layer where the flexible outer surface meets the cellular layer, showing how the cellular material layer is formed with the flexible outer layer 10. The flexible outer surface 10 is moulded onto the honeycomb structure of the cellular material 4. The honeycomb structure provides a greater surface area for the rubber to bond to. As the rubber moulded to the honeycomb structure 4, the rubber 10 at least partially fills the cells of the honeycomb structure 4, as shown in the cross-sectional side view of FIG. 7. The cellular layer 4 supports the rubber flexible outer surface 10 as the fluid or water flows over it, thereby minimising the foil distortion due to friction at the flexible outer surface 10.

Figure 3B:
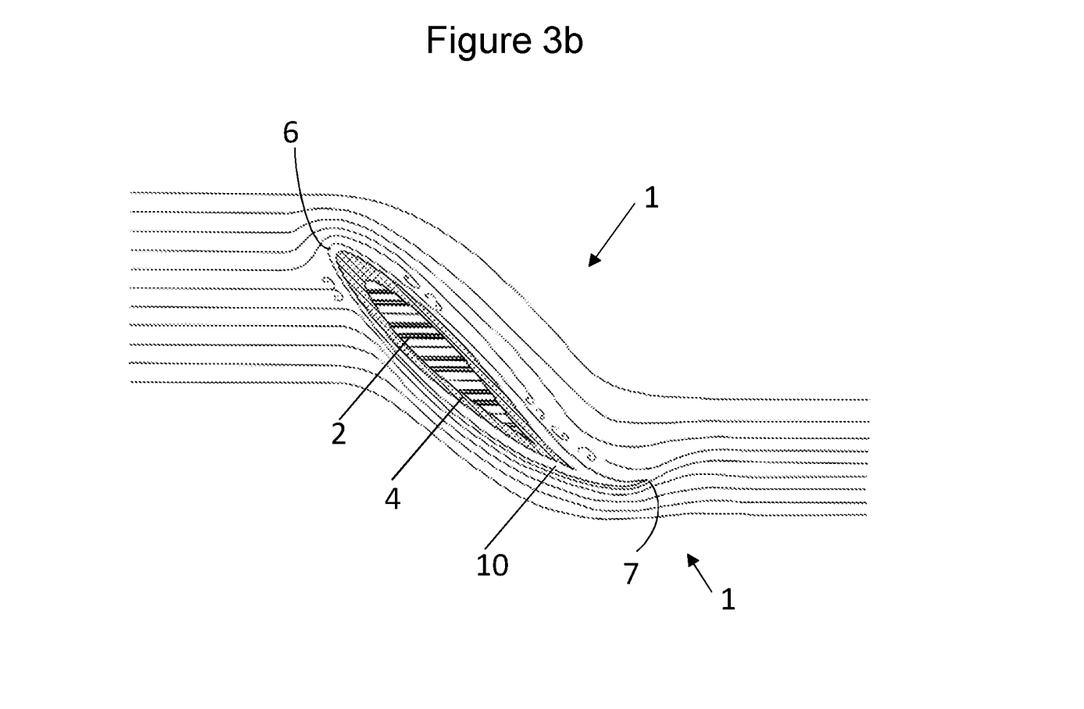

Returning to FIGS. 3a and 3b, FIG. 3b shows how the exemplary foil of FIG. 3a performs when in a fluid stream such as water. Staged deflection of the foil 1 is provided by the three layer structure of the foil 1. The flexible outer surface 10 deflects more readily in response to loading applied to the foil by the fluid stream. This means the trailing edge is able to respond to potential disturbances in the flow and retain laminar flow along the foil profile. The cellular material layer 4 provides more limited deflection in response to higher loading.

The table below provides exemplary modulus of elasticity data for the three different layers. The modulus of elasticity (also known as the elastic modulus, tensile modulus, or Young's modulus) measures an object's resistance to being deformed elastically (i.e. non-permanently) when a force is applied. The elastic modulus of an object is defined as the slope of its stress-strain curve in the elastic deformation region. A stiffer material has a higher elastic modulus. The spar material is chosen to be relatively more rigid than the cellular material 4. The cellular material 4 is chosen to be of an intermediate stiffness relative to the materials of the spar 2 and the flexible outer surface 10. The material of the flexible outer surface 10 is chosen to be more flexible than the cellular material 4, and significantly more flexible relative to the spar 2.

| Component | Material | Modulus of elasticity (GPa) | Elongation % |
|---|---|---|---|
| Spar | Carbon fibre reinforced plastic | 50 | 0.1 |
| | Glass fibre reinforced plastic | 28 | 0.2 |
| | Metal, for example aluminium | 60-200 | 5-25 depending on alloy |
| Cellular material | Polymer honey comb | 2-21 | 10-110 |
| Flexible outer surface | Silicon | 1 | 250 |
| | Rubber | 1.5 | 150 |
| | Polymer, for example polypropylene | 1.4-3.1 | 110-130 |

The elongation denotes the change in length before a breaking point is reached and expresses this as a percentage relative to the original length, thereby quantifying the ability of an object to stretch up to its breaking point. The higher the percentage elongation the further the object is able to stretch before breaking. When designing a foil, the spar 2 is chosen to be of a more rigid material than the cellular material 4, as shown in the table. The flexible outer surface 10 is chosen to be significantly more flexible than the spar 2 and the cellular material 4 and to provide elastic deformation under load. The cellular material layer provides an intermediate flexure level under load.

Figure 4A:
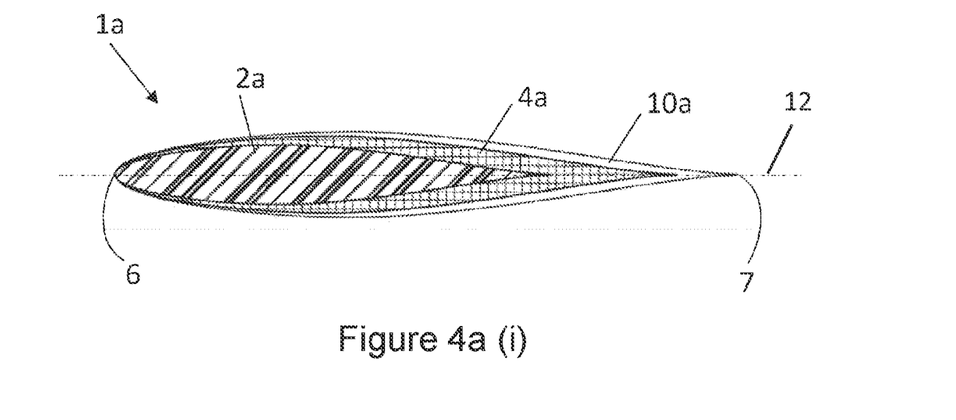
Figure 4B:
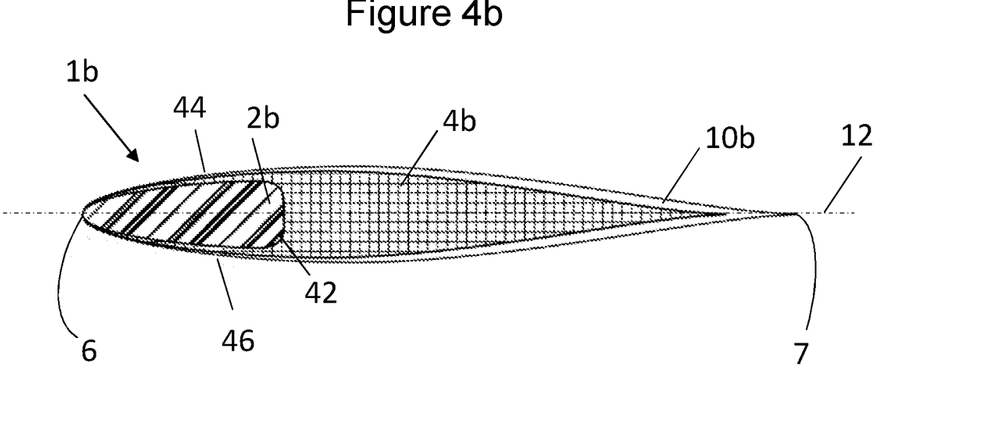
FIG. 4b is a chordwise cross sectional view of a foil according to the first embodiment, having a spar located towards the leading edge of the foil, and terminating at the quarter chord region.
Figure 4C:
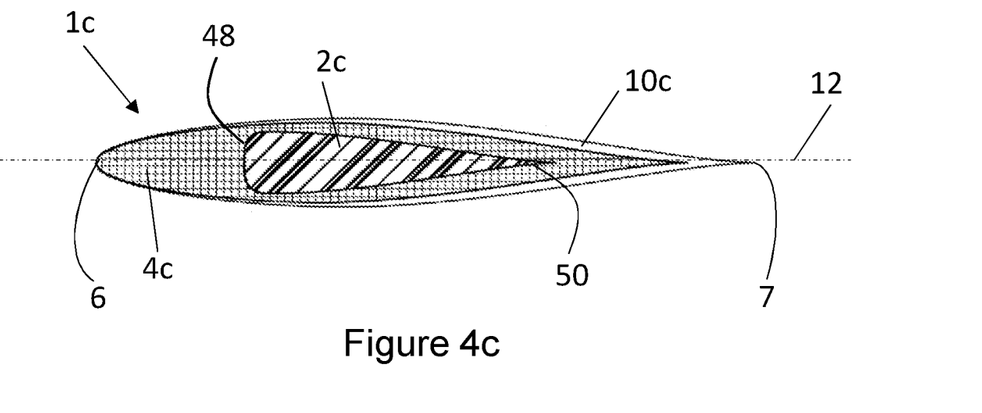
FIG. 4c is a chordwise cross sectional view of a foil according to the first embodiment, having a spar arranged centrally within the foil in a chordwise direction and extending over a portion of the foil chordwise length.

FIGS. 4a to 4c show alternative foil designs according to the first embodiment. Each Figure shows a chordwise cross-sectional view though the foil. The dimensions of the spar 2 and the location of the spar 2 within the foil 1 is different in each of FIGS. 4a to 4c. In an embodiment, the relative profile of the three layers within the foil is maintained along the span of the foil even as the foil tapers towards the end or tip of the foil. Alternatively, the location of the spar along the chordwise axis, and/or the profile of the spar, may vary along the span.

In FIG. 4a (i) and (ii), the spar 2a has a symmetrical profile about a chordwise extending axis 12. The spar 2a extends from a location at the leading edge 6 of the foil 1a to a location towards the trailing edge 7 of the foil 1a. The leading edge of the spar in the exemplary embodiment of FIG. 4a (i) and (ii) is located in the chordwise direction at substantially 2-10% of the chord length from the leading edge of the foil. In the exemplary embodiment of FIG. 4a (i) and (ii), the spar 2a terminates at approximately the three-quarter chord location. In alternative embodiments, the spar may extend to more or less than the three-quarter chord location. The spar 2a thus extends over a majority of the chordwise length of the foil. The cellular material 4a is then formed or moulded around the spar 2a. The profile of the cellular material 4a layer differs from the profile of the spar 2a. The cellular material layer 4a extends beyond the spar 2a in a chordwise direction to encapsulate the spar. The cellular material layer 4a provides a region of the foil 1a able to deflect elastically when a certain load threshold is reached. Towards the leading edge 6, the cellular material layer 4a is significantly thinner relative to the thickness towards the trailing edge 7. The foil profile is therefore more rigid at the leading edge 6 than at the trailing edge 7, since the majority of a thickness between the two fluid dynamic surfaces of the foil 1a at the leading edge 6 is comprised of the spar 2a and cellular material layer 4a.

The flexible outer surface 10a forms a layer encapsulating the cellular material layer 4a and spar 2a. The flexible outer surface 10a is thinner towards the leading edge 6 than towards the trailing edge 7. The flexible outer surface 10a has a profile which differs compared to the profiles of both the cellular material 4a layer and the spar 2a. The flexible outer surface 10a extends beyond the cellular material layer 4 towards the trailing edge 7. The trailing edge 7 of the foil 1a is thereby the region of the foil having the highest relative flexibility. This allows the trailing edge 7 to deflect more readily under load than other parts of the foil 1a.

Thus, for the reasons described above, the foil profile is more rigid at the leading edge than at the trailing edge. In all embodiments, the position of the spar 2a within the foil 1a, and the relative thicknesses of the cellular material layer 4a and flexible outer surface layer 10a, are each controlled in order to control the relative rigidity of the leading and trailing edges of the foil.

FIG. 4a (ii) shows the foil 1a of FIG. 4a (i) with a hollow spar 2a. All other details of the foil remain the same as in FIG. 4a (i).

FIG. 4b shows an alternative foil 1b according to the first embodiment. In this foil 1b, the spar 2b is located towards the leading edge 6, so that its centre of rigidity and most of its bulk is forwards of the quarter chord position. The spar 1b does not extend beyond the half chord location. In cross-section the spar 1b is approximately bullet shaped. The spar 2b has a generally curved leading edge 40 nearest the leading edge 6 of the foil and a generally flat trailing edge 42 located in the region of the quarter chord position. The generally flat trailing edge 42 extends part way between the first foil surface 44 and the second foil surface 46, and generally perpendicular to the chordwise axis 12. The spar 2b has a curved shape between the curved leading edge 40 and the generally flat trailing edge 42.

The cellular material layer 4b in this embodiment forms the core of the foil 1b extending in a chordwise direction from the generally flat trailing edge 42 of the spar 2b to near the trailing edge 7 of the foil 1b. The cellular material layer 4b encapsulates the spar 2b. Similarly to the foil 1a of FIG. 4a (i) and (ii), the cellular material layer 4b is significantly thinner near the leading edge 6 relative to any other region of the foil 1b.

The flexible outer layer 10b is moulded over the cellular material layer 4b. Similarly to the foil 1a of FIG. 4a, the flexible outer layer 10b is thicker at the trailing edge 7 region of the foil 1b than at the leading edge 6 region. The flexible outer layer 10b extends in a chordwise direction beyond the cellular material layer 4b at the trailing edge 7. The trailing edge 7 of the foil 1b is thereby the region of the foil having the highest relative flexibility. This allows the trailing edge to deflect more readily under load than other parts of the foil.

FIG. 4c shows a foil 1c having a spar 2c located around the geometric centre of the foil 1c that is generally triangular in cross-section. The triangular shape is generally symmetrical about the chordwise axis 12. The spar 2c is located approximately centrally within the foil 1c in a chordwise direction. The triangular shape has a generally flat leading edge 48 towards the leading edge 6 of the foil and generally tapers to a point at trailing edge 50 towards the trailing edge 7 of the foil. The spar 2c has a gently curved shape between its leading edge 48 and trailing edge 50. The spar 2c extends in a forwards direction to approximately the quarter chord position. The cellular layer 4c forms the majority of the cross-sectional area of the foil, between the leading edge 6 of the foil and the leading edge 48 of the spar 2c.

The cellular material layer 4c is moulded to the spar 2c and extends towards the leading edge 6 and the trailing edge 7 to provide a symmetrical shape for the foil 1c. The flexible outer surface 10c is moulded to the cellular material layer 4c. The flexible outer surface 10e is thicker towards the trailing edge 7 than at the leading edge 6. The flexible outer surface 10c extends beyond the cellular material layer 4c at the trailing edge 7.

All the foils 1, 1a, 1b and 1c of this embodiment provide deformation of the foil towards the trailing edge via the partially flexible cellular material layer 4, 4a-4c. The flexible outer layer 10, 10a-10c allows for local compression and extension of the foil surface at the leading 6 and trailing 7 edges.

Although the spars 2b and 2c are shown as solid spars in FIGS. 4b and 4c, the skilled person will appreciate that the spars could be hollow tubular spars. The spars 2, 2a-2c may also taper along the spanwise length of the foil towards the lower end or tip of the foil 1, 1a-1c.

Figure 5:
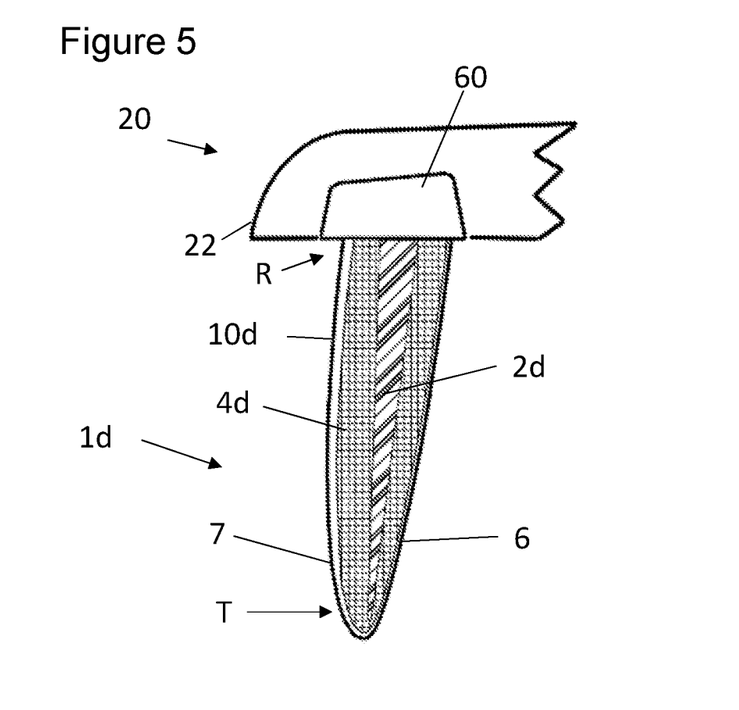
FIG. 5 is a spanwise cross-sectional view though a foil according to the first embodiment when attached to a waterborne vessel.

FIG. 5 shows a spanwise cross-section through a foil 1d according to the first embodiment. The foil 1d has a tapered spar 2d along the length or span of the foil 1d. The spar 2d is thicker in cross-section towards the root or upper end R of the foil 1d and tapers to a narrower section towards the tip or lower end T of the spar 2d.

The chordwise location of the spar within the overall profile of the foil changes along the span. Near the root R of the foil 1d the location of the mechanical centre is further towards the trailing edge 7 than the centre of lift (i.e. the location of the resultant lift force) of the foil. This offset results in the foil 1d having a positive twist moment at the root R, i.e. the foil 1d twists in a clockwise direction about the centre of mass. The chordwise profile of the foil 1d at this spanwise location may be similar to that shown in FIG. 4c. Towards the tip T of the foil 1d, the location of the mechanical centre is further towards the leading edge 6 than the centre of lift. This offset results in the foil 1d having a negative twist moment at the tip T, i.e. the foil 1d twists in an anti-clockwise direction about the centre of mass. The foil 1d thereby provides improved lift or side force for a given angle to the flow (due to positive twist at the spanwise root of the foil), and reduced drag at the spanwise tip of the foil (due to negative tip twist).

The cellular material layer 4d encapsulates the spar, and the profile of the cellular material layer 4d also changes along the length of the foil 1d from the root R to the tip T. The flexible outer layer 10d is then moulded to the cellular material layer 4d to provide the outer profile of the foil 1d.

FIG. 5 shows how the upper end of the foil 1d attaches to the lower surface 22 of the board 20. The upper end of the foil 1d is mounted to an attachment fixture 60. The fixture 60 seats into a recess in the lower surface 22 of the board 20.

Figure 7:
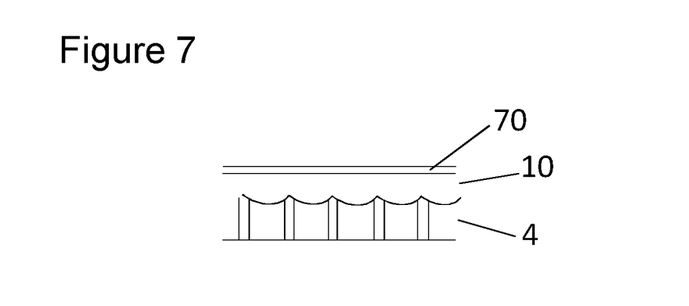
FIG. 7 is a cross-sectional side view through the cellular layer, the flexible outer surface layer and outer film of a foil according to the first embodiment.

The flexible outer surface layer may optionally have an outer film 70. FIG. 7 provides a cross-sectional view through the cellular layer 4 and flexible outer surface 10 of the foil, showing the outer film 70. The outer film 70 encapsulates the foil 1 and is a monofilm polyester of approximately 0.25 mm in thickness. The outer film 70 has a Young's Modulus of around 15 GPa and an elongation of around 5%. In alternative embodiments, the material of the film and the thickness may vary. The outer film 70 forms a protective outer layer and protects the foil 1 from being cut or otherwise damaged when in use or being transported.

Figure 8:
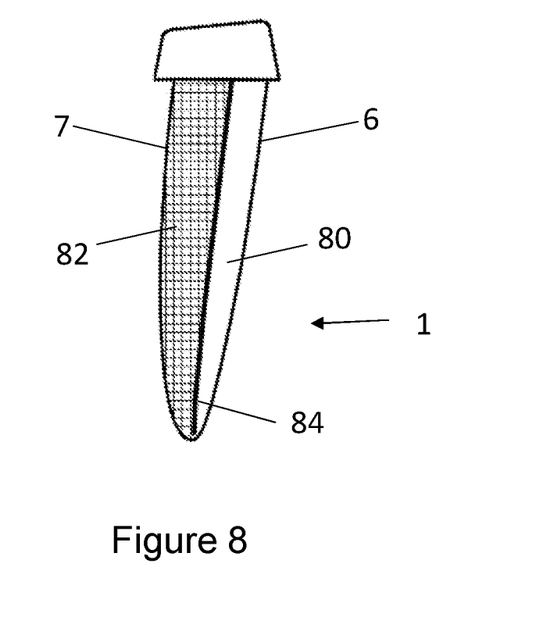
FIG. 8 is a side view of a foil according to the invention, showing how the surface finish of the flexible outer surface varies in a chordwise direction across the foil.

The foils of the illustrated embodiments have a varying surface finish across the surface of the foil in the chordwise direction. Varying the surface finish enables greater control of flow separation at the boundary layer, and therefore the transition from laminar to turbulent flow as fluid flows across the profile of the foil. The moulded surface finish of the flexible surface layer is designed to suit the local Reynolds Number under anticipated flow conditions. FIG. 8 shows schematically the outer surface of an exemplary foil 1. The surface finish near the leading edge 6 is smoother than the surface finish near the trailing edge 7. The smoother surface finish area 80 meets a region of coarser surface finish 82 towards the trailing edge 7 of the foil 1 where the boundary layer separates at a trip location 84. The trip location 84 is the position along the chordwise direction of the foil 1 where the transition to a turbulent boundary layer occurs. The coarser surface finish has the appearance of sharks skin. In FIG. 8 the transition from a smooth to a coarser surface finish is shown as a generally straight line. Alternatively, the transition between surface finishes may be a curved line. The curved line may vary according to the foil section chord length of the foil and the flexibility of the foil.

Figure 9:
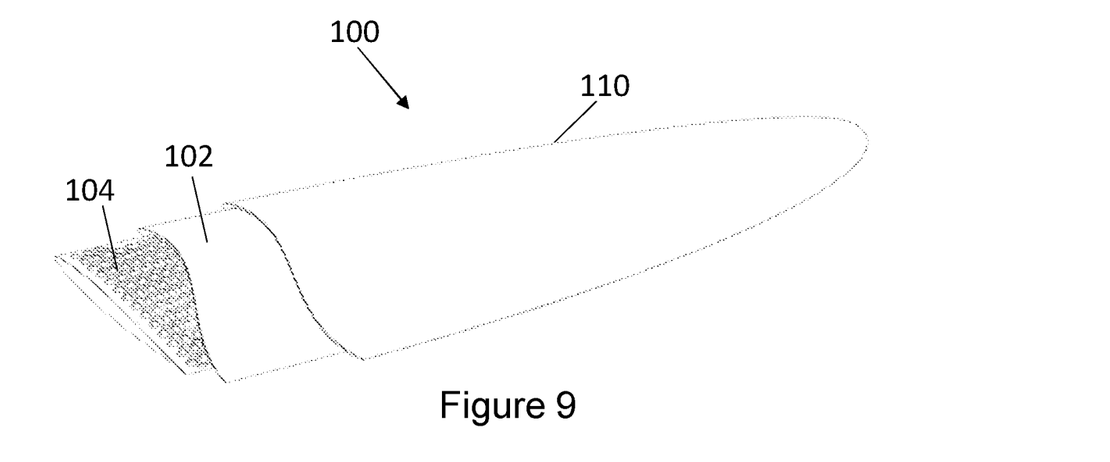
FIG. 9 is a perspective view of a foil according to a second embodiment of the invention, in which cellular material is encapsulated by a rigid spar and a flexible outer surface surrounds the spar and defines the foil profile.

FIG. 9 shows a perspective view of a foil 100 according to a second embodiment. Many features of this embodiment correspond to like features of the first embodiment and so the description below of the second embodiment is directed mainly to those features which differ. Like features are identified by reference numerals an increment of 100 above those of the first embodiment.

In the illustrated embodiment the cellular material layer 104 forms the core of the foil 100, and the spar 102 encapsulates the cellular material layer 104. A flexible outer surface 110 encapsulates the spar 102.

Figure 10:
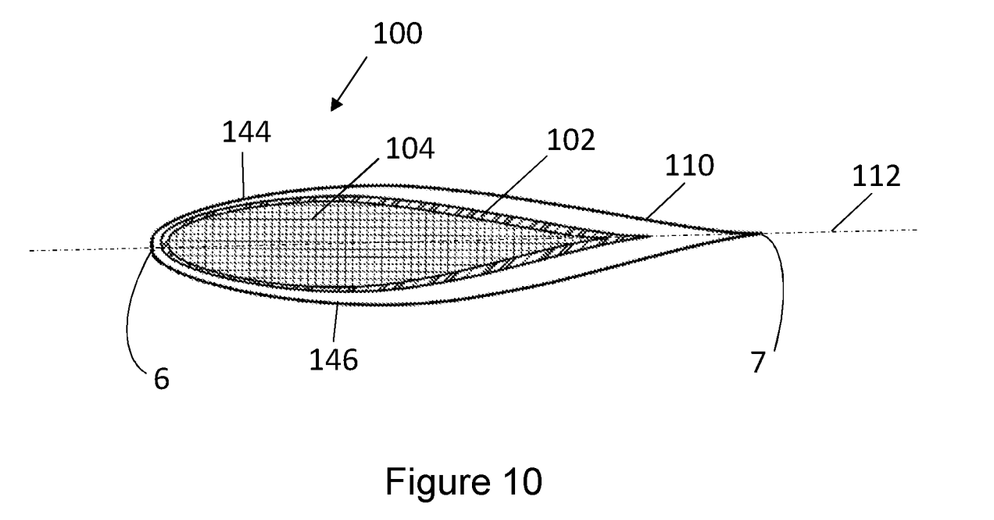
FIG. 10 is a chordwise cross sectional view of the foil of FIG. 9.
Figure 11:
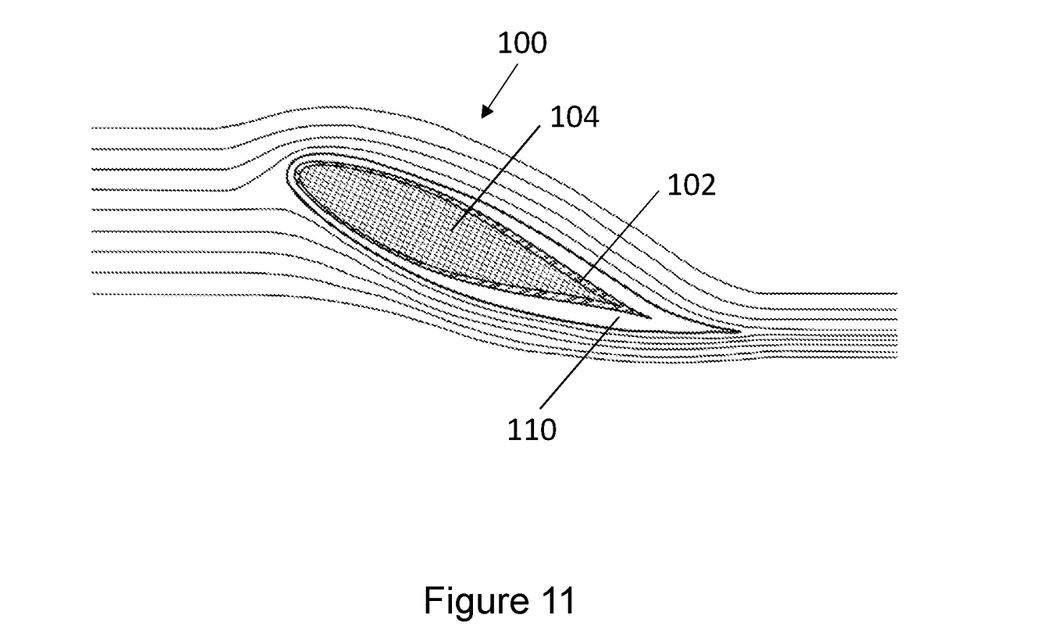
FIG. 11 shows the foil of FIG. 10 in a fluid steam.

FIG. 10 shows a chordwise cross-sectional view of the foil 100. The spar 102 is hollow and is located symmetrically around a chordwise extending axis 112. The spar 102 extends from a location at the leading edge 6 of the foil 100 to a location towards the trailing edge 7 of the foil 100. In the exemplary embodiment shown in FIG. 10, the spar extends over around 85% of the chord length of the foil. In alternative embodiments, the spar may extend over more or less than 85% of the chord length, but typically more than 50%.

The foil 100 could be manufactured in various ways. For example, the cellular material layer 104 may be formed first, and the spar 102 then formed in a fibre reinforced composite by laying up plies on the honeycomb structure 104. Alternatively, the cellular material 104 could be formed or moulded inside the spar 102. The spar 102 extends in a chordwise direction, so as to make up the majority of a thickness between the upper 144 and lower 146 fluid dynamic surfaces of the foil 100 towards the trailing edge 7.

Similarly to the first embodiment, the cells of the honeycomb structure of the cellular material 104 are arranged substantially perpendicular to the flexible outer surface 110.

The flexible outer surface 110 is then formed or moulded around the spar 102. The flexible outer surface 110 forms a layer encapsulating the spar 102. The flexible outer surface layer 110 is thinner towards the leading edge 6 than towards the trailing edge 7. The flexible outer surface 110 extends beyond the cellular material layer 104 towards the trailing edge 7. The thickness of the flexible outer surface 110 is greatest towards the trailing edge 7. The thickness of the flexible outer surface 110 in a direction generally perpendicular to the chordwise direction becomes thicker towards the trailing edge 7 than at the leading edge 6.

The foil according to the illustrated embodiment has a varying surface finish and optional outer film as described above for the first embodiment.

The combination of the three layers comprising the spar 102, the cellular material layer 104, and the outer flexible layer 110 together make up the foil 100. Although in the illustrated embodiments the cross-sectional profile of each layer is symmetrical about the chordwise axis 112, in other embodiments the foil may be asymmetric about the chordwise axis such that one or more of the layers is asymmetric about the chordwise axis. Alternatively and as described above for the first embodiment, the location and/or profile of the spar along the chordwise axis may vary in the spanwise direction in order to provide positive and/or negative twist moments about the centre of lift of the foil 100.

The spar 102 is rigid and there is no intermediate cellular layer between the spar 102 and the flexible outer surface 10. The flexible outer surface 10 at the trailing edge 7 of the foil 100 is thereby the only region of the foil able to flex.

In all embodiments, the spar within the foil provides the foil with a mechanical centre or centre of rigidity, which is offset from the location of the resultant lift force if twisting of the foil is desired. The mechanical centre is located at the geometric centre of the spar, or its centre of rigidity. The spar may be configured such that the mechanical centre is located between the leading edge 6 and the resultant lift force, resulting in the foil 1b having a negative twist moment (i.e. the foil 1b twists in an anti-clockwise direction about the spar centre). In other embodiments, the mechanical centre may be located between the trailing edge 7 and the resultant lift force, resulting in a positive twist moment. In yet further embodiments, the chordwise location of the spar may vary in the spanwise direction so that there is a positive twist moment at one end of the foil and a negative twist moment at the other end. The progressive reduction in angle of the foil to the flow towards the tip of the foil reduces the spanwise velocity component, tip vortex and foil drag.

Figure 12A:
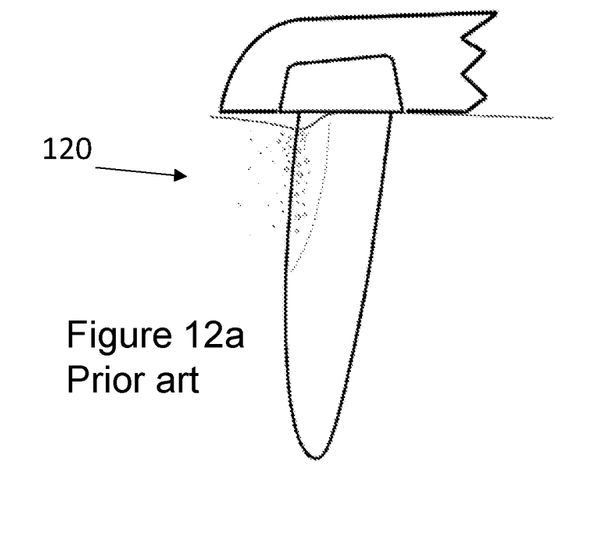
FIG. 12a is a side view of a conventional foil in a fluid stream showing a typical aeration profile.
Figure 12B:
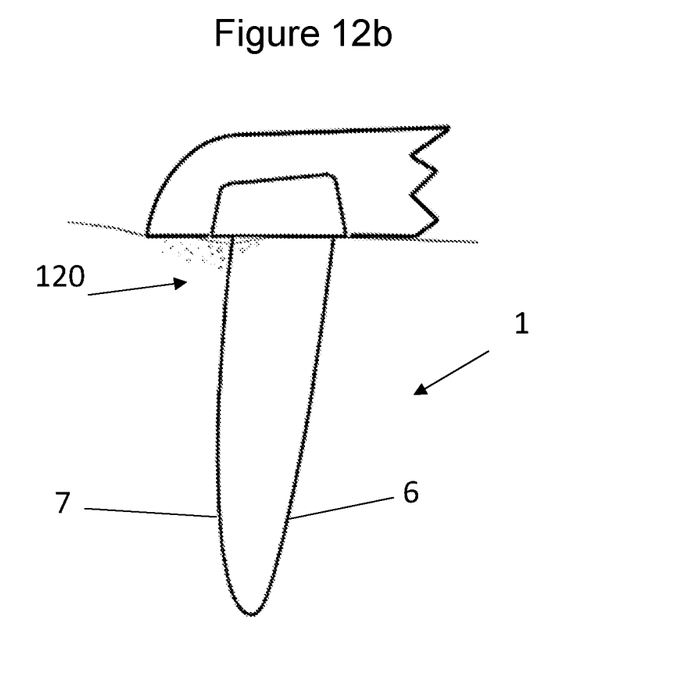
FIG. 12b is a side view of a foil according to the invention showing a typical aeration profile.
Figure 12C:
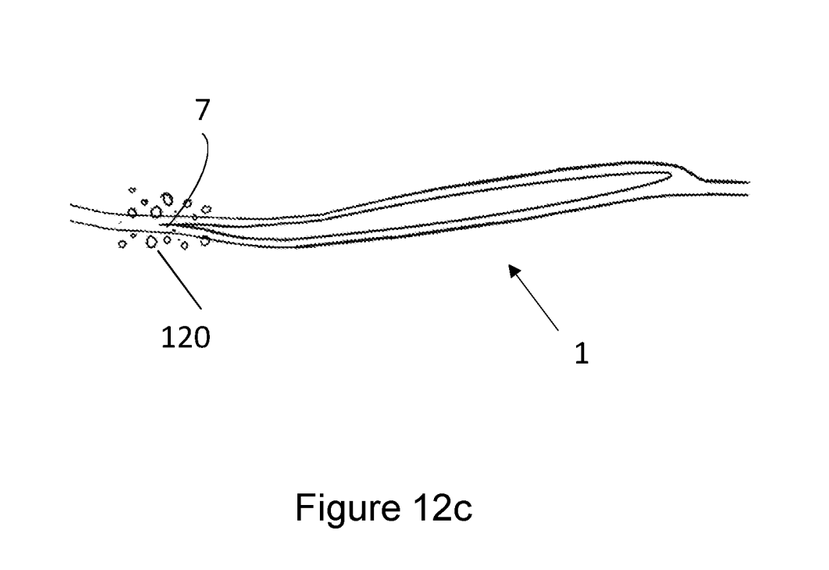
FIG. 12c is a plan view of the foil of FIG. 12b.

FIG. 12a shows a conventional foil with aeration occurring at the trailing edge. FIGS. 12b and 12c show how a foil 1, 100 according to the first or second embodiment of the invention flexes to accommodate and hence obviate aeration. Aeration occurs as a result of the pressure differential between one side of the foil and the second side of the foil as lift is generated. When a foil is operating under load and at speed, air can be drawn from the surface of the water into a low-pressure region at the upper part of the foil at the trailing edge 7. Once aeration starts to occur, air is rapidly drawn down the trailing edge of the foil, as shown in FIG. 12a, affecting the lift performance of the foil and potentially causing the foil to stall. FIG. 12b shows a side view of a foil according to the first or second embodiment 1, 100 in water with a reduced level of aeration 120 occurring along the trailing edge 7. FIG. 12c shows a plan view of the same foil 1, 100 with reduced aeration 120 occurring towards the trailing edge 7 of the foil 1, 100. At the root of the foil, the profile of the flexible surface layer is increased (not shown in FIG. 5) in order to provide a region of increased flexibility. Concentrating flexibility and elasticity particularly at the trailing edge 7 near the surface, enables the trailing edge 7 to elastically deform when aeration starts to occur, and so prevents aeration developing further. FIGS. 12b and 12c show how aeration is controlled and minimised when compared with the conventional foil of FIG. 12a.

Although the invention has been described above with reference to one or more preferred embodiments, it will be appreciated that various changes or modifications may be made without departing from the scope of the invention as defined in the appended claims.

The invention claimed is:

1. A passively controlled fluid foil, having a span and an outer surface, the passively controlled fluid foil comprising:
   a rigid spar extending in the spanwise direction;
   a cellular polymer material; and
   a flexible elastic outer surface layer defining a profile of the outer surface of the foil and encapsulating the cellular polymer material and the spar,
   wherein the flexible elastic outer surface layer at least partially fills one or more cells of the cellular polymer material.

2. The passively controlled fluid foil according to claim 1, wherein the cellular polymer material encapsulates the spar.

3. The passively controlled fluid foil according to claim 1, wherein the spar encapsulates the cellular polymer material.

4. The passively controlled fluid foil according to claim 1, wherein the spar comprises a tube or a tapering tube.

5. The passively controlled fluid foil according to claim 1, wherein the spar is a single spar.

6. The passively controlled fluid foil according to claim 1, wherein the foil has a chord, the chord having a length in a chordwise direction, and a leading edge of the spar is located in the chordwise direction at substantially 2-10% of the chord length from a leading edge of the foil.

7. The passively controlled fluid foil according to claim 1, wherein the spar comprises a fibre reinforced matrix material or a metal.

8. The passively controlled fluid foil according to claim 1, wherein the foil has a chordwise profile, and the chordwise profile of the foil as manufactured is substantially asymmetrical.

9. The passively controlled fluid foil according to claim 8, wherein the cellular polymer material has an outer surface having a chordwise profile, the chordwise profile of the outer surface of the cellular polymer material being substantially the same as the chordwise profile of the foil as manufactured.

10. The passively controlled fluid foil according to claim 1, wherein the cellular polymer material comprises cells, the cells having an axis arranged substantially perpendicular to the outer surface of the foil.

11. The passively controlled fluid foil according to claim 1, wherein the cellular polymer material comprises a honeycomb structure or foamed polymer.

12. The passively controlled fluid foil according to claim 1, wherein the flexible elastic outer surface layer comprises rubber, an elastomer, or silicon rubber.

13. The passively controlled fluid foil according to claim 1, wherein the spar has a chordwise location within the foil, and the chordwise location of the spar varies along a span of the foil.

14. The passively controlled fluid foil according to claim 13, wherein at a first spanwise location the spar is offset in a first chordwise direction from a resultant lift force acting on the foil in use, and at a second spanwise location the spar is offset from the resultant lift force in a second chordwise direction generally opposite to the first chordwise direction.

15. The passively controlled fluid foil according to claim 1, wherein the flexible elastic outer surface layer is encapsulated by an outer film.

16. The passively controlled fluid foil according to claim 1, wherein the foil has a leading edge and a trailing edge, the flexible elastic outer surface layer having a thickness, the thickness being greater at the leading edge and/or the trailing edge than in a central region intermediate the leading edge and trailing edge.

17. The passively controlled fluid foil according to claim 1, wherein the flexible elastic outer surface layer has a surface finish, and the surface finish varies across the foil.

18. The passively controlled fluid foil according to claim 17, wherein the surface finish near the leading edge is smoother than the surface finish near the trailing edge.

19. The passively controlled fluid foil according to claim 1, wherein the foil is a hydrofoil.

* * * * *